United States Patent
Maier et al.

(10) Patent No.: US 7,963,149 B2
(45) Date of Patent: Jun. 21, 2011

(54) METHOD AND DEVICE FOR DETERMINING HYDRAULIC LEAKAGE RATE IN LIQUID-CONVEYING SECTIONS, IN PARTICULAR, INJECTION VALVES OF INTERNAL COMBUSTION ENGINES

(75) Inventors: Martin Maier, Moeglingen (DE);
Frank Mozer, Stuttgart-Hofen (DE);
Eberhard Waibler, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 12/090,516

(22) PCT Filed: Oct. 12, 2006

(86) PCT No.: PCT/EP2006/067321
§ 371 (c)(1),
(2), (4) Date: Jul. 2, 2008

(87) PCT Pub. No.: WO2007/060061
PCT Pub. Date: May 31, 2007

(65) Prior Publication Data
US 2008/0314120 A1   Dec. 25, 2008

(30) Foreign Application Priority Data

Nov. 23, 2005  (DE) .......................... 10 2005 055 746

(51) Int. Cl.
*G01M 3/02* (2006.01)
*G01M 3/16* (2006.01)
(52) U.S. Cl. ........ 73/47; 73/40; 73/40.7; 73/46; 73/49.7
(58) Field of Classification Search ............... 73/40–49.8
See application file for complete search history.

(56) References Cited

U.S. PATENT DOCUMENTS

| | | | |
|---|---|---|---|
| 4,919,893 A | * | 4/1990 | Bandurski et al. .............. 422/78 |
| 5,212,979 A | | 5/1993 | Albrodt et al. |

(Continued)

FOREIGN PATENT DOCUMENTS

DE         3725052 A1 *  2/1989

(Continued)

OTHER PUBLICATIONS

Machine translation of German Patent Application Publication DE 19838749 A1 originiallly published on Mar. 3, 2000.*

(Continued)

*Primary Examiner* — David A. Rogers
(74) *Attorney, Agent, or Firm* — Kenyon & Kenyon LLP

(57) ABSTRACT

A method and device for determining the hydraulic leakage rate of liquid-conveying parts, in particular injection valves for internal combustion engines, place the liquid-conveying part into a test body, and the liquid-conveying part is charged with a test liquid under a particular pressure, and a carrier gas stream is provided in a flow duct of the test body, and a vapor mixture behind the liquid-conveying part is conducted to an analyzer, and a measurement and analysis are carried out, using the analyzer, of the hydraulic leakage rate of the liquid-conveying part via the concentration of test liquid in the vapor mixture, the carrier gas stream being brought in via a nozzle element close to the leakage point of the liquid-conveying part, and/or a heating of the vapor mixture being provided behind the liquid-conveying part for complete conversion into the gas phase. The testing device is particularly suitable for leakage measurement in fuel injection valves used in fuel injection systems of mixture-compressing externally ignited internal combustion engines.

17 Claims, 2 Drawing Sheets

U.S. PATENT DOCUMENTS

| | | | | |
|---|---|---|---|---|
| 5,553,483 A | * | 9/1996 | Armentrout et al. | 73/40 |
| 5,834,631 A | * | 11/1998 | Yamaguti et al. | 73/40 |
| 5,835,976 A | * | 11/1998 | Kent et al. | 73/40.7 |
| 6,062,067 A | * | 5/2000 | Schoeffel et al. | 73/37 |
| 6,494,082 B1 | * | 12/2002 | Mizobe | 73/40 |
| 2005/0126278 A1 | * | 6/2005 | Tani et al. | 73/149 |

FOREIGN PATENT DOCUMENTS

| | | | |
|---|---|---|---|
| DE | 4026228 | | 8/1991 |
| DE | 19809926 A1 | * | 9/1999 |
| DE | 19838749 | | 3/2000 |
| JP | 03279834 A | * | 12/1991 |
| JP | 04332820 A | * | 11/1992 |
| JP | 11022598 A | * | 1/1999 |
| JP | 2000081361 A | * | 3/2000 |
| JP | 2003-206832 | | 7/2003 |
| WO | WO 9962300 A1 | * | 12/1999 |

OTHER PUBLICATIONS

International Search Report, PCT International Patent Application No. PCT/EP2006/067321, dated Jan. 29, 2007.

* cited by examiner

METHOD AND DEVICE FOR DETERMINING HYDRAULIC LEAKAGE RATE IN LIQUID-CONVEYING SECTIONS, IN PARTICULAR, INJECTION VALVES OF INTERNAL COMBUSTION ENGINES

FIELD OF THE INVENTION

The present invention relates to a method and device for determining the hydraulic leakage rate of liquid-conveying parts, in particular injection valves for internal combustion engines.

BACKGROUND INFORMATION

German Patent No. DE 40 26 228 C1 describes a test device for determining the hydraulic leakage rate of a fuel injection valve, in particular for internal combustion engines. This test device is situated obliquely in a vessel filled with liquid, into which there also opens a compensating vessel that can be separated by a blocking valve, as well as riser pipe fashioned as a glass capillary, the level in the capillary being illuminated by a light source and the determination of the level being acquired by a linear line scan camera. After the measurement of the initial level in the capillary, the injection valve is charged with a test pressure, and after the measurement time the change in the level in the capillary is measured using the line scan camera. The leakage rate of the injection valve can be calculated from the measurement time, the cross-sectional surface, and the displacement path in the capillary. Such a test device has a complicated design and does not provide absolutely precise measurement results.

Moreover, in order to determine the leakage rate of an injection valve it is known to use a test device in which the injection valve is placed into a test body, the injection valve being charged with a test liquid under pressure and the quantity leaked into the test body being borne away by ambient air. The leakage rate can then be determined by measuring and evaluating the concentration of the test liquid in the ambient air stream using an analyzer. Such a test device has the flaw that the leakage quantity, in particular in the case of liquids having low vapor pressures, is converted to the vapor phase incompletely and in an undefined manner, thus falsifying the determined measurement value or its curve over time. Disadvantageously, in this way during one and the same measurement process leakage flows are indicated that are in part too low and in part too high. Moreover, a partially or completely produced vapor phase can condense after the leakage point, in particular at cooler locations on the test body or at other locations of the test device, which can also falsify the measurement value. Here as well, there is the danger of measurement of a too-low and/or too-high leakage flow, or of a leakage flow that fluctuates strongly throughout. This disadvantage occurs in particular in the case of measurements using liquids or liquid mixtures that condense with a particular pressure, temperature, or concentration under measurement chamber conditions.

SUMMARY

An example method and device according to the present invention for determining the hydraulic leakage rate of liquid-conveying parts, in particular injection valves for internal combustion engines, may have the advantage that very precise measurement results can be achieved in a simple and economical manner. Advantageously, the exiting liquid leakage is converted completely to the vapor phase and is kept there until the actual concentration measurement takes place.

Advantageously, for this purpose a nozzle element is positioned close to the leakage point of the liquid-conveying part for the blowing off and carrying along, by the carrier gas stream, of the test liquid exiting through the leakage point.

It may be particularly advantageous to provide a heating element behind the leakage point of the liquid-conveying part, in particular of the injection valve, in the test body. The heating of the carrier gas stream along a sufficiently long stretch in the test body prevents re-condensation of the vapor phase. The vapor phase is maintained completely up until entry into the analyzer used for the measurement and analysis. Advantageously, simple and inexpensive heating hoses can be used as heating elements.

The pressure of the test liquid can be selected very low, <1 bar, because according to example embodiments of the present invention, a nozzle element is put in close to the leakage point and a heating element is provided behind the leakage point make it possible to determine leakages without the production of pressure.

BRIEF DESCRIPTION OF THE DRAWINGS

Exemplary embodiments of the present invention are shown in simplified form in the figures and are explained in more detail below.

DETAILED DESCRIPTION OF EXAMPLE EMBODIMENTS

Figure 1:
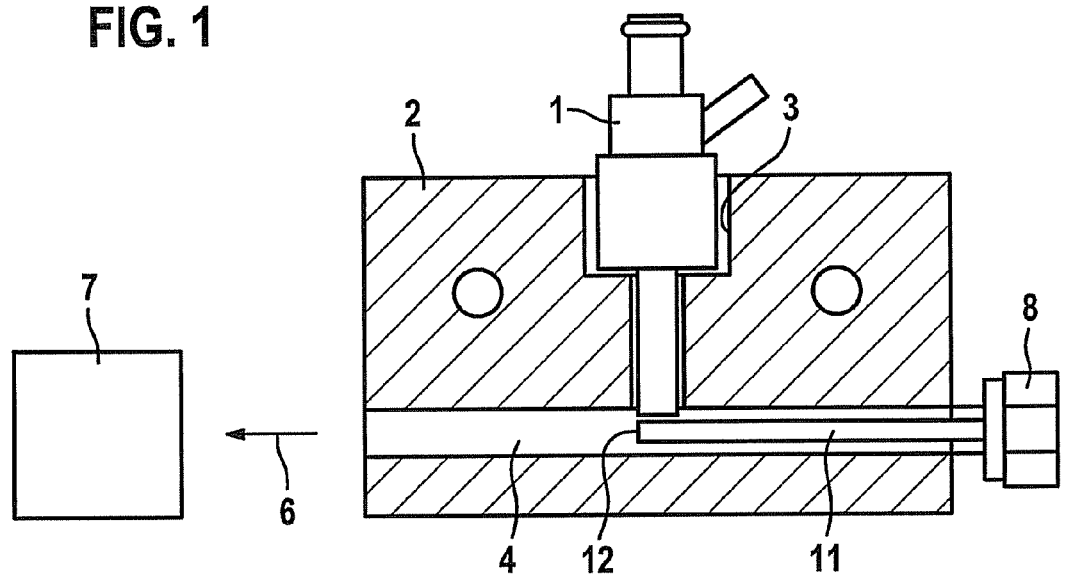
FIG. 1 shows a schematic representation of a first device for determining the hydraulic leakage rate of injection valves, in particular for internal combustion engines.

FIG. 1 shows a schematic representation of a first device for determining the hydraulic leakage rate of injection valves, in particular for internal combustion engines. Here, fuel injection valve 1, shown an outline, is realized for example as an electromagnetically actuated valve in the form of an injection valve for fuel injection systems of mixture-compressing, externally ignited internal combustion engines. Such a fuel injection valve 1 has as an actuator an electromagnetic circuit having a magnetic coil that has a core that acts as an inner pole, and having an external magnetic component as well as a movable armature that is in turn effectively connected to a valve closing element. The valve closing element works together with a fixed valve seat to open and close the injection valve, the valve seat having at least one ejection opening downstream in the direction of flow via which the fuel can be purposely emitted.

As an excitable actuator of fuel injection valve 1, instead of the electromagnetic circuit it is also possible to provide, e.g., a piezoelectric or magnetostrictive drive.

Fuel injection valve 1 shown in FIG. 1 represents a particularly suitable example of a liquid-conveying part that can be installed into the device according to the present invention for determining a hydraulic leakage rate and for which the method according to the present invention for determining the leakage rate can be carried out. However, the present invention is in no way limited to fuel injection valves 1, but rather is also capable of being applied to numerous other liquid-conveying parts in order to carry out an optimized conditioning of leakage points in such parts, components, aggregates, valves, nozzles, etc.

The device according to the present invention for determining the hydraulic leakage rate of liquid-conveying parts, in particular injection valves 1 for internal combustion engines, includes a test body 2 that has a receiving bore 3 for the liquid-conveying part, here fuel injection valve 1. A flow duct 4 runs through test body 2, essentially perpendicular to the orientation of receiving bore 3, and is used to conduct a carrier gas stream, indicated by arrow 5 in FIG. 2, and to conduct away a vapor mixture, indicated by arrow 6, to an analyzer 7. Carrier gas 5, in particular nitrogen $N_2$, is provided to test body 2 via a conveyor pump (not shown). Via a connecting aggregate 8, carrier gas 5 can be introduced to flow duct 4 of test body 2 safely and reliably and without leakage.

In order to determine the hydraulic leakage rate of fuel injection valve 1, this valve is charged with a test liquid, indicated by arrow 10. As test liquid 10, in particular n-heptane ($C_7H_{16}$) may be used. However, any pure liquid hydrocarbons, benzenes, or pure alcohols may also be used as test liquid 10. In practical applications, test liquid 10 is introduced into the liquid-conveying part, in particular fuel injection valve 1, with a pressure in the range from <1 to 200 bar. Test liquid 10 can optimally be used in a temperature range from −40° C. to 140° C. Under the action of test liquid 10, supplied to fuel injection valve 1 under pressure, certain leakages occur at the downstream end of fuel injection valve 1; these leakages exit in particular at seat leakage points and flow into flow duct 4 of test body 2.

An object of the present invention is to achieve maximally optimized, fluctuation-free, and very precise measurements of the leakages of fuel injection valve 1. Advantageously, for this purpose, starting from connecting aggregate 8 a nozzle element 11 is placed in flow duct 4 whose at least one nozzle opening 12 is positioned in the immediate vicinity of the leakage area, i.e., the seat leakage point of fuel injection valve 1. Via nozzle element 11, carrier gas 5 is transported to a position immediately adjacent to the leakage point, so that, immediately behind nozzle opening 12, it can blow off the leakage liquid and carry it along. Given the use of $N_2$ as carrier gas 5, care should be taken to use gas having a purity rating of 5 or higher. In practical applications, carrier gas 5 is blown in with a pressure ranging from 0.5 to 2 bar. Carrier gas 5 can also typically be used in a temperature range from −40° C. to 140° C. Carrier gas stream 5, which is for example conveyed continuously, ideally has a flow rate between 0.5 and 10 liters per minute at standard temperature and pressure. Through nozzle element 12, directed mainly at the leakage point, according to the present invention the exiting leaking liquid is converted completely to the vapor phase and is kept there until the actual concentration measurement takes place in analyzer 7. Directly at the leakage point of the part being tested, the free gas jet of carrier gas 5 of nozzle element 11 produces a sharp decrease in the concentration and/or a high detaching force, which enable the complete vaporization of the leaking liquid. A disadvantageous mechanical contacting or change in the leakage point is excluded in this way.

Figure 2:
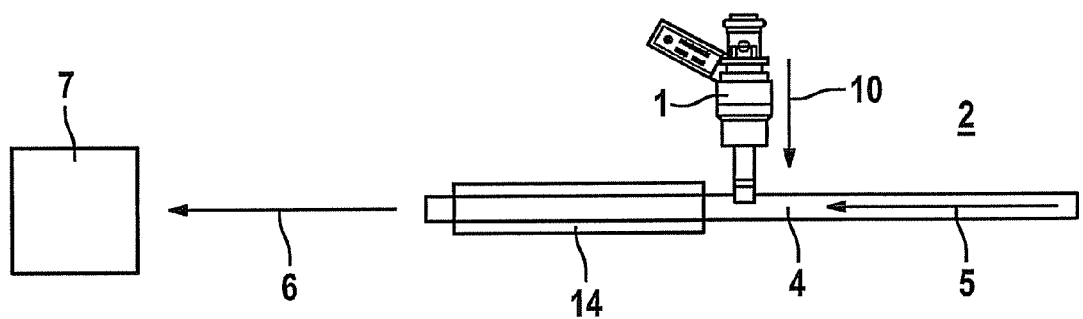
FIG. 2 shows a schematic representation of a second device for determining the hydraulic leakage rate of injection valves, in particular for internal combustion engines.

FIG. 2 shows a schematic representation of a second device for determining the hydraulic leakage rate of injection valves, in particular for internal combustion engines. Here, test body 2 is provided with a heating element 14. It is particularly advantageous to situate heating element 14 immediately behind the leakage point of the liquid-conveying part, in particular behind fuel injection valve 1. The heating of carrier gas stream 5 or of vapor mixture 6 along a sufficiently long stretch in or on test body 2 prevents re-condensation of the vapor phase. The vapor phase is completely maintained up until entry into the analyzer 7 that is used for the measurement and analysis.

Advantageously, simple and inexpensive heating hoses can be used as heating elements 14.

The pressure of test liquid 10 can be chosen very low, <1 bar, because the measures according to the present invention according to which a nozzle element 11 is situated close to the leakage point, and heating element 14 is provided behind the leakage point, make it possible to determine leakages even without the production of pressure.

The measures according to the present invention according to which a nozzle element 11 is situated close to the leakage point, and heating element 14 is provided behind the leakage point, can of course be used together on test body 2; the combination of the two measures is even the most effective way of bringing about the complete conversion of test liquid 10 to the vapor phase.

In order to measure the leakage of fuel injection valve 1, vapor mixture 6 is brought into analyzer 7, analyzer 7 being used to detect test liquid 10 that may be contained in vapor mixture 6 in the vapor phase. Particularly suitable analyzers 7 include flame ionization detectors (FID) or gas chromatographs (GC) in primary flow or secondary flow operation. The flame ionization detector is a detector of organic compounds (hydrocarbons) that can also be used in connection with a gas chromatograph. Its principle of operation is the measurement of the conductivity of an oxyhydrogen gas flame (hydrogen as combustion gas) between two electrodes. Substances to be analyzed are transported into the flame using a carrier gas stream and are thermally ionized there. In this way, in the voltage field a measurable ion stream is produced that is recorded on a connected recording instrument or data system. The hydrocarbon concentration of vapor mixture 6 can in this way be determined very easily and precisely, permitting precise conclusions to be drawn concerning the size of the leak in the liquid-conveying part being tested.

Figure 3:
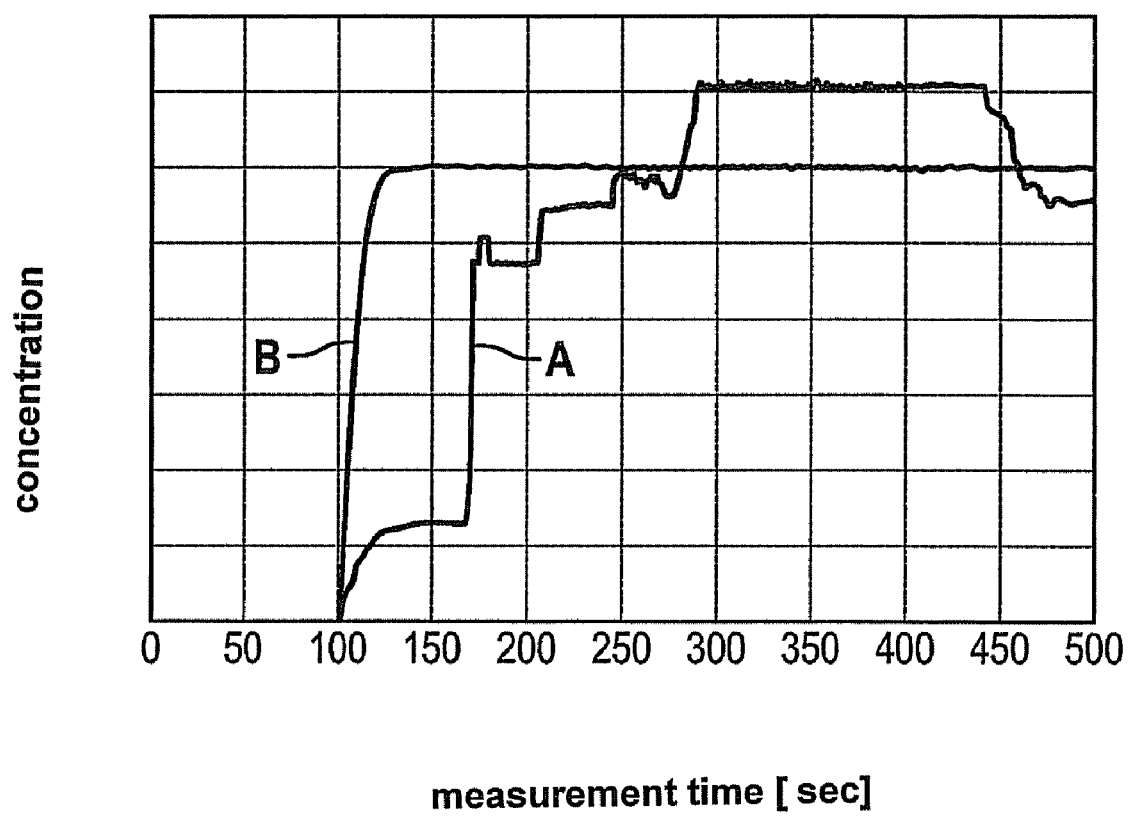
FIG. 3 shows a diagram having two measurement curves plotted for the purpose of comparison, indicating the concentration of hydrocarbons in a vapor mixture behind a seat leakage point of an injection valve with and without the measures according to the present invention, determined using a flame ionization detector.

FIG. 3 shows a diagram having two measurement curves plotted for comparison, indicating the hydrocarbon concentration in a vapor mixture 6 behind a seat leakage point of a fuel injection valve 1 with and without the measures according to the present invention, determined using a flame ionization detector (FID). The hydrocarbon concentration contained in vapor mixture 6 is plotted over a measurement time of 500 seconds. Both measurement curves were plotted under comparable background conditions, such as type, pressure, and temperature of test liquid 10, as well as type, pressure, and temperature of carrier gas 5, for one and the same fuel injection valve 1. The measurement of the hydrocarbon concentration, using an analyzer 7 in the form of a flame ionization detector, in order to determine the hydraulic leakage rate of fuel injection valve 1 was carried out once with a test body 2 without nozzle element 11 and heating element 14 (measurement curve A) and once with a test body 2 with integrated nozzle element 11 and heating element 14 (measurement curve B).

Because in a test device not having the features according to the present invention, the leakage liquid is converted to the vapor phase incompletely and in an undefined manner, the measurement values determined using analyzer 7, or the temporal curves thereof, are in a certain manner falsified. The diagram in FIG. 3 makes it clear that, disadvantageously, leakage flows are indicated during one and the same measurement process that are in part too low and in part too high, and that in addition can fluctuate significantly. In contrast, the use of nozzle element 11 and heating element 14 makes possible a very precise determination of the hydrocarbon concentration, the measurement value remaining stable already after a measurement time of approximately 120 seconds without larger fluctuations, as is illustrated by measurement curve B.

The method for determining the hydraulic leakage rate of liquid-conveying parts 1, here fuel injection valves 1, is applied in such a way that the at least one fuel injection valve 1 is tested in a manner according to the present invention before being installed in the internal combustion engine, and subsequently only those fuel injection valves 1 are installed in the internal combustion engine whose hydraulic leakage rates are lower than a previously determined boundary leakage rate.

What is claimed is
1. A method for determining the hydraulic leakage rate of a liquid-conveying part, comprising:
  placing the liquid-conveying part into a test body;
  charging the liquid-conveying part with a test liquid under a particular pressure;
  providing a carrier gas stream in a flow duct of the test body;
  conducting a vapor mixture behind the liquid-conveying part to an analyzer; and
  measuring and analyzing, using the analyzer, a hydraulic leakage rate of the liquid-conveying part via a concentration of the test liquid in the vapor mixture;
  wherein
    the carrier gas stream is provided via a nozzle element close to a leakage point of the liquid-conveying part.
2. The method as recited in claim 1, wherein the liquid-conveying part is an injection valve for an internal combustion engine.
3. The method as recited in claim 1, wherein n-heptane is used as the test liquid.
4. The method as recited in claim 1, wherein nitrogen is used as the carrier gas.
5. The method as recited in claim 1, wherein the test liquid and the carrier gas are each provided in a temperature range from −40° C. to 140° C., the test liquid being introduced into the liquid-conveying part with a pressure in the range from <1 to 200 bar, while the carrier gas is blown in with a pressure in the range from 0.5 to 2 bar.
6. The method as recited in claim 1, wherein the conveyed carrier gas flow is between 0.5 and 10 liters per minute at standard temperature and pressure.
7. The method as recited in claim 1, wherein the vapor mixture is heated behind the liquid-conveying part, and the heating of the vapor mixture is carried out using a heating hose.
8. The method as recited in claim 1, wherein the analyzer is at least one of a flame ionization detector and a gas chromatograph with which the hydrocarbon concentration in the vapor mixture is measured and the hydraulic leakage rate of the liquid-conveying part is analyzed.

9. The method as recited in claim 1, wherein the nozzle element has at least one nozzle opening positioned directly downstream from the leakage point of the liquid-conveying part.
10. A device for determining a hydraulic leakage rate of an injection valve for an internal combustion engine, comprising:
  a test body into which the injection valve that is to be tested and that is capable of being charged with a test liquid can be placed;
  a flow duct in the test body in which a carrier gas stream can be provided and that is used to conduct a vapor mixture behind the injection valve to an analyzer; and
  a nozzle element positioned near a leakage point of the injection valve for the blowing off and carrying along of the test liquid by the carrier gas stream.
11. The device as recited in claim 10, wherein the flow duct in the test body runs generally perpendicular to a receiving bore for the injection valve.
12. The device as recited in claim 10, wherein the nozzle element has at least one nozzle opening that is situated in an immediate vicinity of an area of the leak in the injection valve.
13. The device as recited in claim 10, further comprising:
  a heating element provided behind the injection valve for the heating of the vapor mixture, wherein the heating element is a heating hose.
14. The device as recited in claim 10, wherein the analyzer is at least one of a flame ionization detector, and a gas chromatograph with which the hydrocarbon concentration in the vapor mixture can be measured.
15. The device as recited in claim 10, wherein the nozzle element has at least one nozzle opening positioned directly downstream from the leakage point of the injection valve.
16. A method for operating an internal combustion engine having at least one fuel injection valve as a liquid-conveying part, the method comprising:
  placing the liquid-conveying part into a test body;
  charging the liquid-conveying part with a test liquid under a particular pressure;
  providing a carrier gas stream in a flow duct of the test body;
  conducting a vapor mixture behind the liquid-conveying part to an analyzer;
  measuring and analyzing, using the analyzer, a hydraulic leakage rate of the liquid-conveying part via a concentration of the test liquid in the vapor mixture;
  wherein
    the carrier gas stream is provided via a nozzle element close to a leakage point of the liquid-conveying part; and
  installing only those fuel injection valves whose hydraulic leakage rates are lower than a previously determined boundary leakage rate.
17. The method as recited in claim 16, wherein the nozzle element has at least one nozzle opening positioned directly downstream from the leakage point of the liquid-conveying part.

* * * * *